Jan. 30, 1951   B. H. LOCKE   2,539,517
ANTISKID CROSS CHAIN AND ATTACHING MEANS
Filed July 22, 1948

INVENTOR
Burton H. Locke

Patented Jan. 30, 1951

2,539,517

UNITED STATES PATENT OFFICE 2,539,517

ANTISKID CROSS CHAIN AND ATTACHING MEANS

Burton H. Locke, Framingham, Mass.

Application July 22, 1948, Serial No. 40,107

6 Claims. (Cl. 152—233)

1

This invention relates to improvements in individual antiskid cross chains for vehicle wheels; especially in the method and means of attaching such chains to the wheel.

One object of the invention is to set forth a simple method of applying antiskid cross chains to a vehicle wheel wherein the chains can be individually attached to the wheel by the ends thereof without the usual necessity of threading the chains through openings in the wheel and interconnecting the ends thereafter as has been required heretofore.

Another object is to provide means whereby relatively large numbers of individual cross chains can be applied to a wheel for utilization whenever considerable traction is required.

Another object is to afford an all-metal attachment so as to eliminate failures which are inherent in the conventional cross chains in present day use due to the extensive breakage of the flexible fabric straps that are required to be utilized in connecting such chains to the wheel for reason to facilitate threading through openings in the wheel prior to fastening thereof.

Another object is to provide a novel means whereby the chains can be applied to the wheel with a minimum of slack allowance between the wheel and the chain and to provide a further means that will prevent operative detaching of the chains after installation.

Another object is to afford a method of attachment that positions the attaching points relatively near the periphery of the wheel and at respective sides thereof so as to eliminate excessive reaching to make the connection. This will afford chains that are simple in construction and short in length and, therefore would be relatively inexpensive to produce and could be offered to the consumer at a relative low cost.

By providing constructions whereby a relative large number of cross chains can be easily and quickly applied to a vehicle wheel, I afford means whereby a so-called "emergency" condition can be effected by the application of 2 or 3 cross chains in the time of emergency, or a so-called "full" chain condition for continuous service can be effected, if required, by the application of a large number of cross chains.

The number of present day conventional cross chains that can be applied to a vehicle wheel is limited due to there generally being only four openings in a conventional vehicle wheel through which the cross chains can be threaded and attached. The present day "full" chains are relatively hard to install which generally requires

2 jacking of the wheel to facilitate installation thereof which is exceedingly difficult in emergencies.

The main object of the invention is to set forth a chain structure in combination with a simple means and method of attaching the same to rigid members provided on the wheel of a vehicle to overcome these difficulties and to afford a rigid and substantial construction.

Figures 1, 3:
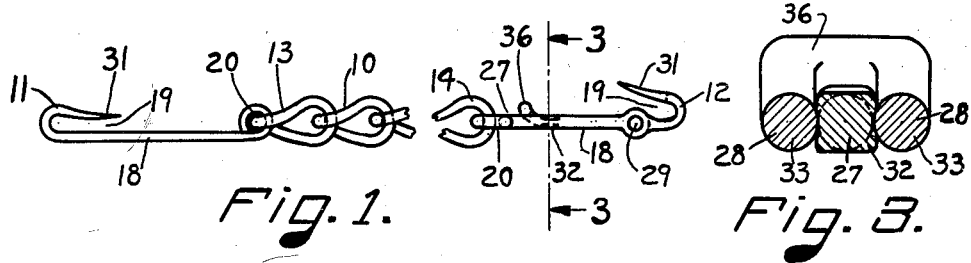
Figure 1 is a side view of a single strand construction of cross chain.
Figure 3 is a section taken on line 3—3, of Figure 1, enlarged.

My improved antiskid cross chain for vehicle wheels comprises a flexible interlinked chain portion 10 having hook elements 11 and 12 attached at the ends 13 and 14 thereof, respectively, as shown in Figure 1. If desired, the chains could be constructed with a plurality of interlinked chain sections 15, such as shown in Figure 2, and in such instances, the said chain sections would be attached to plates, or bars, 16 and 17 and the hook elements 11 and 12 would be attached to the bars, generally at points central to the chain sections 15, to equalize, or balance, the connection of the chain structure to the vehicle wheel.

Figure 2:
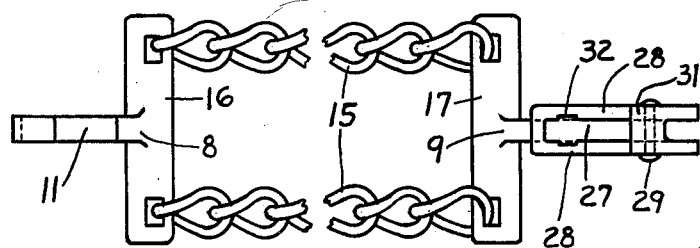
Figure 2 is a plan view of a double strand constructed chain.
Figure 4:
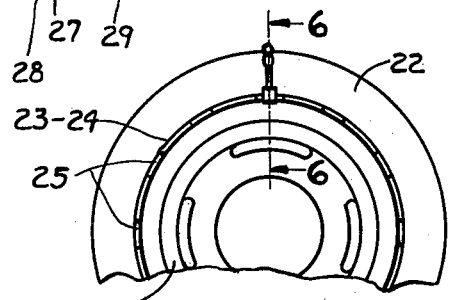
Figure 4 is a fragmental side view of a vehicle wheel showing a single cross chain attached to the wheel flanges.

The hook elements 11 and 12 comprise a substantial long shank portion 18 having an open hook 19 formed at one end thereof and the other end 20 thereof interlooped with the ends 13 and 14, of the chain section 10, in the construction shown in Figure 1, or fastened at 8 and 9 to the bars 16 and 17, respectively, in the construction shown in Figure 2. The purpose of hook elements 11 and 12 is for attaching the chains to a vehicle wheel 21, which supports a pneumatic tire 22 between flanges 23 and 24, thereof, by being hooked through apertures 25 provided in the said flanges. The said hook elements are adapted to the said chain so that the same can be hooked through apertures 25, which are generally provided near the periphery in flanges 23 and 24, from the side of the flanges adjacent to the tire 22, as shown, for the purpose of utilizing the sides of the tire to prevent the said hooks from disengaging from the apertures. The hooks cannot become disengaged from the apertures without sufficient slack in the chain to permit the hooks to swing outward and down towards the hub of the wheel, as shown by dotted lines 26. Furthermore, when the tire is in contact with the ground, which is the position where it is essential that the hooks remain intact because of the pull imposed on the chain by the traction of the wheels, the tire is depressed outward due to the weight of the vehicle and, resultantly, presses against the shank portions 18, of the hook elements 11 and 12, and retains the said hook elements tightly within apertures 25.

It will be noted that flanges 23 and 24, of wheel 21, are extended outward slightly from normal conventional constructions to permit affordation of apertures 25 near the periphery thereof. Another construction could be to form, or secure, lugs at desired intervals on the periphery of said flanges and provide apertures therein.

The shank portion 18, of hook element 11, is in one section and the hook, thereof, can be attached into an aperture 25 when the chain is free by swinging the chain to position the said hook as shown by dotted lines 26. The shank portion 18, of hook element 12, is constructed in two parts 27 and 28 which are hinged together at a point 29 adjacent to the hook 19 so that the said shank portion can be jack-knifed to facilitate looping the hook into an aperture 25 with a minimum of slack allowed in the chain 10. The said looping is accomplished by starting the said hook at the position shown by dotted lines 30 and the shank 18, of the hook element 12, is brought to its closed installed position simultaneously with the engaging of the hook.

Therefore, it is obvious that hook element 12 can be engaged into an aperture 25 in the manner set forth with the affordation of a relatively small amount of slack in the said chain after the other hook element 11 is first attached to a wheel flange. Therefore, the chain 10 can be attached to flanges 23 and 24, of wheel 21, with only a relatively small amount of slack left therein which, obviously, would not be sufficient to permit either of the hook elements 11 or 12 swinging outward and downward sufficiently to become disengaged from the respective aperture 25, as shown by dotted lines 26. It will be noted that the hooks 19 are provided with substantially long extended ends 31 which taper to a relatively thin point to facilitate engagement of the hooks into the apertures. The apertures are substantially longer than the width of the hooks to further facilitate engagement of the parts.

Obviously, it is necessary that only one of the hook elements have its shank portion hinged in order to permit installation of the chain with a minimum of slack left therein. However, the shanks of both said elements could be hinged, if desired, without departing from the invention.

There are cooperative projections 32 provided on section 27, of shank 18, for the purpose of interlocking sections 27 and 28 when the two said sections are brought together upon installation of the chain. Section 28, of shank 18, comprises two armed portions 33 formed together at the ends thereof and section 27 is hinged therebetween at 29. The arm portions 33 are of resilient material to permit sufficient springing thereof intermediate their end interconnections to admit and confine section 27 intact. Obviously, other means of operatively fastening sections 27 and 28 together in the installed position could be employed without departing from the invention.

Figure 5:
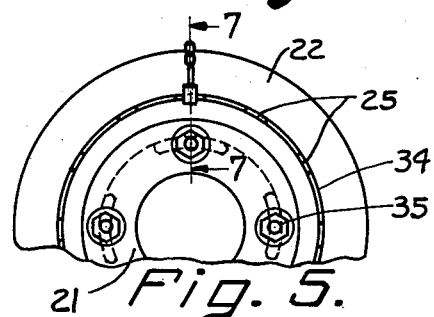
Figure 5 is a fragmental side view of a vehicle wheel showing a single cross chain attached to plates fastened to the sides of the wheel.
Figures 6, 7:
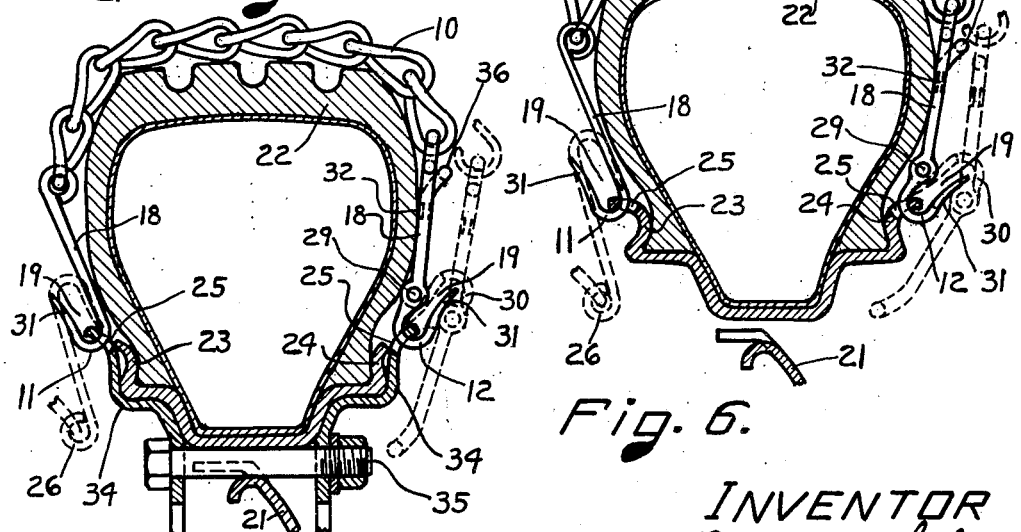
Figure 6 is an enlarged section taken on line 6—6, of Figure 4.
Figure 7 is an enlarged section taken on line 7—7, of Figure 5.

Another embodiment of the invention is shown by Figures 5 and 7 wherein annular plates 34 are secured to the sides of the wheel 21 in some convenient manner, such as by bolts 35 which extend through the said plates and through openings in the wheel. In this construction, the apertures 25 are provided near the periphery of plates 34 and the attachment of the chains is accomplished in the same manner and with the same results being achieved as in the previously described embodiment. In this latter construction, the plates 34 could be attached to the wheel during the winter seasons when the chains are required and removed during the summer seasons, and the said plates could be chromium plated for appearance, if desired.

In the structure set forth for locking the said parts 27 and 28, of hook elements 12, together, the projecting interconnecting end 36, of the arm portions 33, provides a convenient member for use in manually jack-knifing the hook element 12 for removing the chains from the wheel.

If desired the hooks could be covered with a non-metallic material, such as hard rubber, or the like, to eliminate any possibility of metallic sound, or rattle, between the hooks and the wheel flanges 23 and 24, or plates 34.

Obviously, a relatively large number of apertures can be provided in flanges 23 and 24 or in plates 34 and, therefore, a large number of cross chains can be individually applied to a vehicle wheel by the method set forth herein. Furthermore, the chains would be relatively short and can be applied with a minimum of reaching and effort and without jacking of the wheel. A non-yieldable attachment can be afforded and there would be substantially no opportunity for any chains becoming operatively detached because the chains can be applied with a minimum of slack being left therein, and the non-yieldable attachments would substantially eliminate stretch in the chain to permit the hook elements swinging outward and downward and becoming disengaged from the apertures, which would require a relative large amount of slack in the chains, as set forth.

Due to the novel manner of application of the hooks into the apertures, the points of the hooks project outward and the tire contacts the straight shank portion of the hook elements and therefore does not become injured or worn as would be the case if the hooks were inserted into the apertures from the outside and the points of the hooks contacted the tire. Furthermore, should the tire become suddenly deflated while the vehicle is in motion, which is often the case, the tire would flatten and bear against the straight shank portion of the hooks without injury, such as would be experienced if the points of the hooks were between the wheel flanges and the tire.

I do not wish to be confined to the exact details set forth as the same are susceptible of modification without departing from the spirit or scope of the invention set forth.

I claim:

1. An antiskid cross chain comprising a main interlinked portion to extend laterally over the periphery of a tire mounted on a vehicle wheel, a normally open hook element attached to each end of said interlinked portion for the purpose of hooking into apertures provided in the tire retaining flanges of the said wheel, respectively, said hook elements being arranged to be applied through said apertures from the side of the respective flange adjacent to the tire so that the shank portion of the hook element will be confined intermediate the tire and the said flange, at least one of said hook elements having its shank portion in a plurality of interhinged parts for the purpose of permitting installation of said chain on the said wheel by the affordation of a relatively small amount of slack in said chain, and means to lock the said interhinged parts of the shank portions in extended operative position after installation of the chain and thereby restrain the chain from operatively detaching from the wheel.

2. In antiskid cross chains for vehicle wheels described in claim 1, a plurality of interlinked portions to extend laterally over the periphery of a tire arranged in connection to single hook elements for attaching the chain to a wheel as set forth.

3. An antiskid cross chain for a tire mounted vehicle wheel comprising a main linked portion to extend laterally over the tire of said wheel, a hook connected to each end of said linked portion to engage apertures provided at each side of said wheel, respectively, at least one of said hooks being composed of a plurality of interhinged sections to permit jack-knifing of such said hook and thereby afford installation of the hooks into the respective apertures substantially as set forth with substantially little slack requirement in said chain.

4. An antiskid cross chain for a tire mounted vehicle wheel comprising a main linked portion to extend laterally over the tire of said wheel, a hook connected to each end of said linked portion to engage apertures provided at each side of said wheel, respectively, at least one of said hooks being composed of a plurality of interhinged sections to permit jack-knifing of such said hook and thereby afford installation of the hooks into the respective apertures substantially as set forth with substantially little slack requirement in said chain, and means to retain the said interhinged sections of the respective hook in extended association after the installation of the hook to eliminate possibility of operative disengagement of the chain from the wheel.

5. An antiskid cross chain for a tire mounted vehicle wheel comprising a plurality of main linked portions to extend laterally over the tire of said wheel, the ends of said linked portions terminating into common members, respectively, each said member being associated with hook connecting means as described in claim 3 for attaching the chain into respective apertures provided at each side of the vehicle wheel.

6. An antiskid cross chain for a tire mounted vehicle wheel comprising a plurality of main linked portions to extend laterally over the tire of said wheel, the ends of said linked portions terminating into common members, respectively, each said member being associated with hook connecting and retaining means described in claim 4, for attaching the chain into respective apertures provided at each side of the vehicle wheel.

BURTON H. LOCKE.

REFERENCES CITED

The following references are of record in the file of this patent:

UNITED STATES PATENTS

| Number | Name | Date |
| --- | --- | --- |
| 969,425 | Traver | Sept. 6, 1910 |
| 1,330,194 | Krug | Feb. 10, 1920 |
| 1,456,473 | Summerfield | May 22, 1923 |
| 1,492,040 | Lifquist | Apr. 29, 1924 |
| 1,519,810 | Ferrari | Dec. 16, 1924 |
| 2,078,764 | Kielmansegg | Apr. 27, 1937 |
| 2,241,592 | Goldenberg | May 13, 1941 |
| 2,255,350 | Devlin | Sept. 9, 1941 |
| 2,461,737 | Huffman et al. | Feb. 15, 1949 |

FOREIGN PATENTS

| Number | Country | Date |
| --- | --- | --- |
| 203,003 | Switzerland | May 16, 1939 |